Jan. 15, 1929.

A. F. MASURY 1,698,851

SPRING SUSPENSION

Filed July 8, 1926

Jan. 15, 1929.
A. F. MASURY
1,698,851
SPRING SUSPENSION
Filed July 8, 1926
3 Sheets-Sheet 3
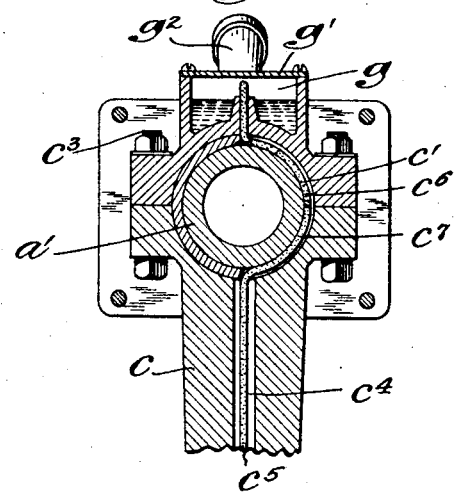
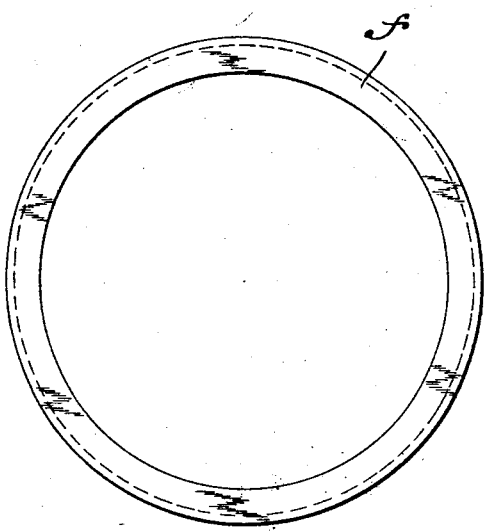
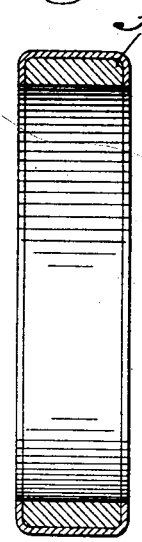
Inventor Patented Jan. 15, 1929.

1,698,851

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

SPRING SUSPENSION.

Application filed July 8, 1926. Serial No. 121,092.

The present invention relates to a spring suspension wherein dual rear axles support the chassis through two pivoting axles which are connected by a suitable bracket secured thereto. This type of construction is shown in detail in the copending application of Josiah E. Reid, Serial No. 130,130.

In the connection between these two axles, provision is made for a small amount of rotation between the axles by means of pivotal connections and it is highly desirable to provide the bearing surfaces between these connections with a lubricant.

It is, therefore, the object of this invention to provide a means for supplying the bearings in the above described structure with a lubricant and in order to set forth the means in greater detail, reference will now be had to the accompanying drawings, wherein:

Figure 3 is a section on line 3—3 of Figure 2 looking in the direction of the arrows.

Figure 4 is a detail view of the oiling ring used on the lower pivoting axle.

Figure 5 is a cross section of the oiling ring shown in Figure 4.

Figure 1:
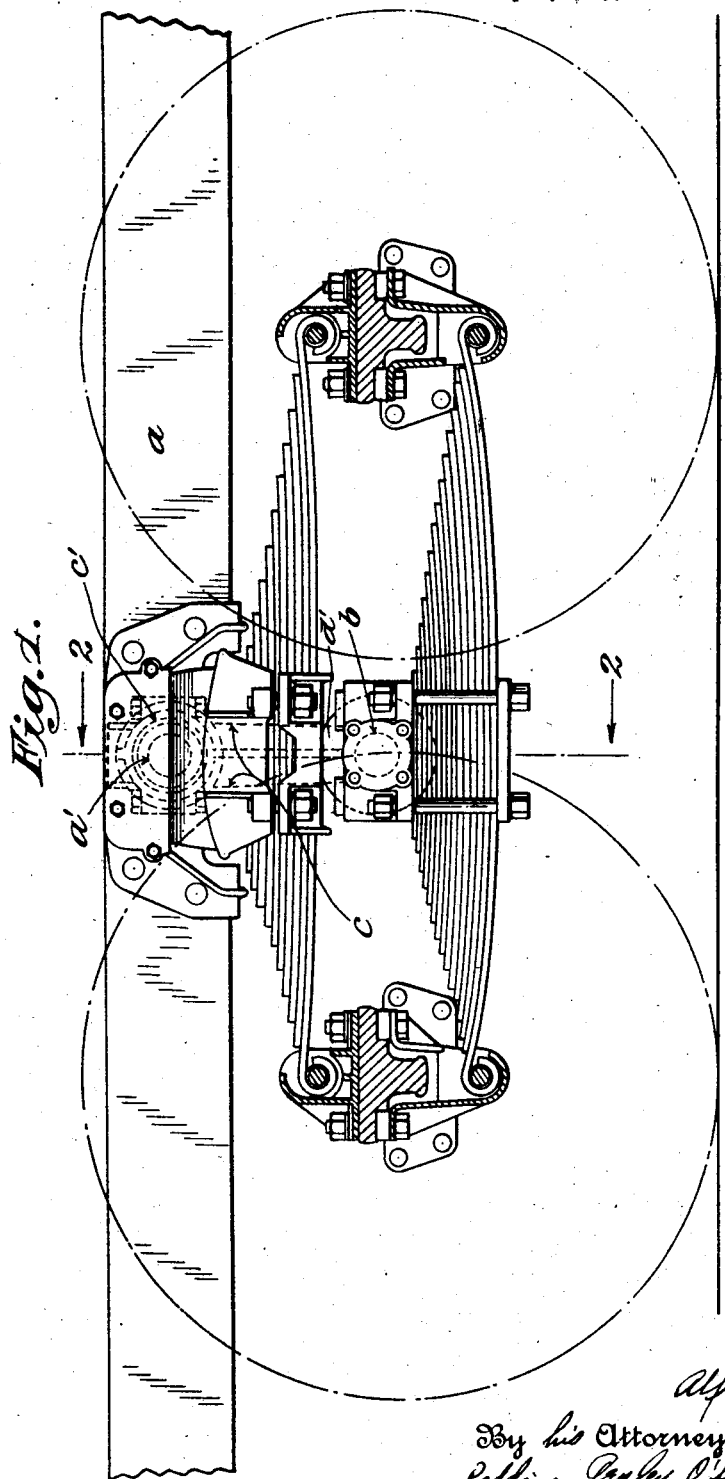
Figure 1 is a side elevation of the spring suspension upon which the present invention is applied.
Figure 2:
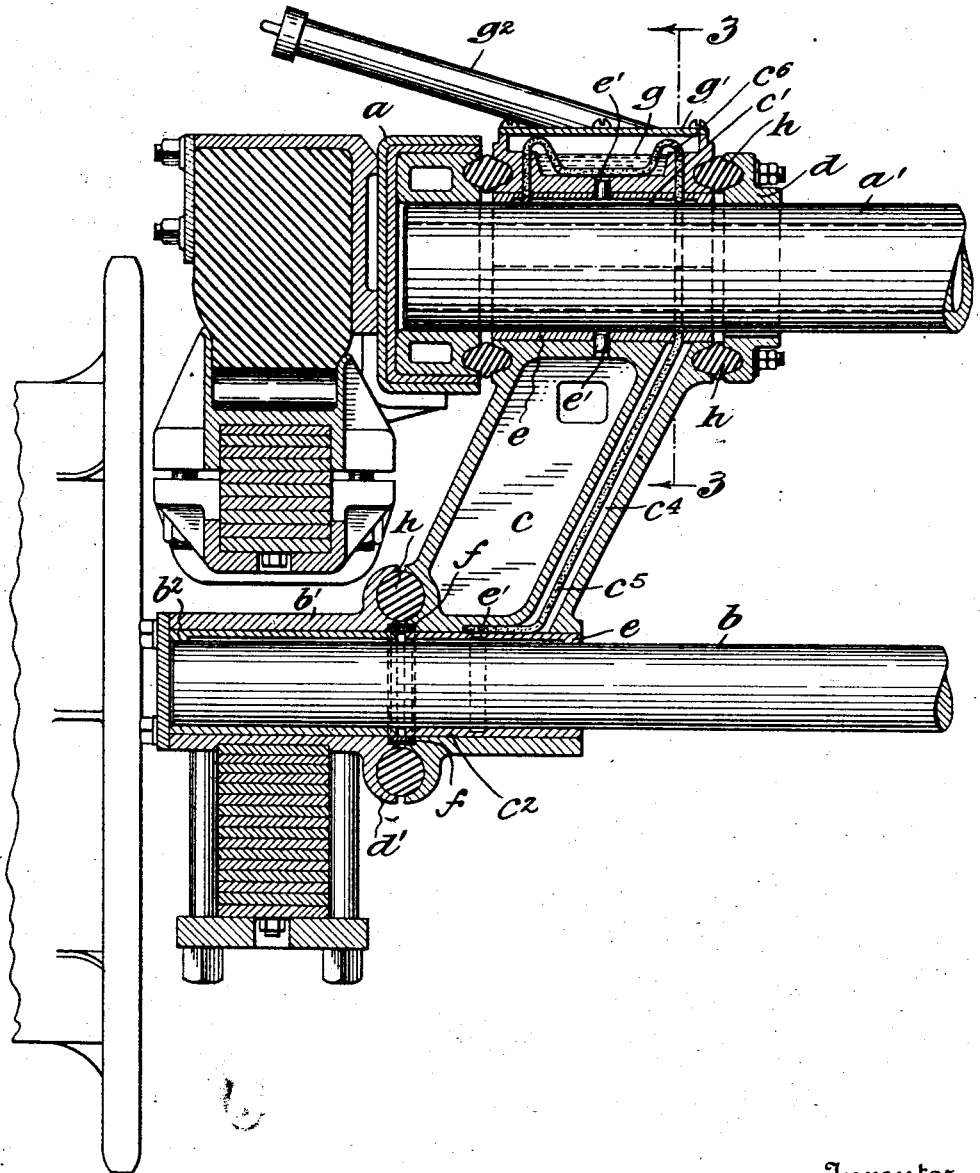
Figure 2 is a section taken on the line 2—2 of Figure 1 and looking in the direction of the arrows.

In the drawings, $a$ represents a pivoting axle carried by the frame of a vehicle. A lower pivoting axle is shown at $b$ and there two members are connected by an arm $c$ which has bearings $c'$ and $c^2$ at its upper and lower ends respectively, for engaging the two axles. The bearings may be formed in sections to facilitate assembly, in which case the removable halves may be bolted on by bolts $c^3$. Each bearing is positioned by suitable collars or other confining means, shown generally at $d$ on the upper axle and $d'$ on the lower one.

The arm $c$ is of an I-beam section and at one side is formed with a passage $c^4$ for an oil wick $c^5$ which serves to lubricate both bearings.

A bushing $e$ is placed in each bearing and has an oil well $e'$ through which oil may pass to the surface to be lubricated. On the end of the lower pivoting axle $b$ is secured a housing $b'$ to which the spring is connected and within which the axle $b$ bears. Between the axle and housing is provided a bushing $b^2$ which is adjacent the bushing $e$. The bushings $e$ and $b^2$ are locked by means of a ring $f$, to prevent the oil from leaking out. A font $g$ is provided in the upper portion of the upper bearing and oil contained in this font is carried to both bushings by wells $e'$ and wick $c^5$ which supplies oil to both bearings through suitable apertures in the bushings. The wick is in two sections, $c^6$ and $c^7$, the first being secured in the upper removable portion of the upper bearing through suitable grooves in the bushing sections, and the second abutting the first to form, in effect, a continuous wick. The other end of the first section also passes through the bushing to oil the top of the bearing. A plate $g'$ is provided over the font and serves to protect the oil contained therein and a tube $g^2$ or other suitable means is provided to supply oil to the font.

The bearings may be confined between cushioning elements $h$ in a suitable manner but such construction forms no part of this invention.

The invention described above has wide applications and is not to be limited save by the accompanying claims.

What is claimed is:

1. In a vehicle having upper and lower pivoting axles, and means connected pivotally through a connecting means pivoted to each and connecting them together, bearings carried by the connecting means, a font carried with one of the bearings, and a wick extending from the font to both of said bearings.

2. In a vehicle having upper and lower pivoting axles, and means connected pivotally through a connecting means pivoted to each and connecting them together, bearings carried by the connecting means, a font carried with one of the bearings, a wick extending from the font to both of said bearings, bushings in the bearings and apertured portions in the bushings permitting the wick to lubricate the bearings.

3. In a vehicle having upper and lower pivoting axles, means pivoted to each and connecting them together, bearings carried by the connecting means, a font carried with one of the bearings, means to lubricate both of the bearings from the font, bushings in the bearings, a bushing on the lower axle adjacent the first bushing and an oil ring to prevent oil from leaking from between the bushings.

This specification signed this 6th day of July A. D. 1926.

ALFRED F. MASURY.